United States Patent Office 2,742,394
Patented Apr. 17, 1956

2,742,394

OIL OF CHENOPODIUM COMPOSITIONS AND METHOD OF PREPARING

George V. Davis and Daniel H. Le Gear, St. Louis, Mo., assignors to Dr. L. D. Le Gear Medicine Co., St. Louis, Mo., a corporation of Missouri No Drawing. Application September 23, 1952, Serial No. 311,143

4 Claims. (Cl. 167—53)

This invention relates to the preservation of volatile oils broadly and has particular reference to the preservation thereof for anthelmintic use.

Oil of chenopodium possesses valuable anthelmintic properties and its primary source resides in wormseed. This source is subject to seasonal variations and for this reason the supply of chenopodium oil is by no means sufficient at times to fill the demand. It therefore becomes highly important to find some means for preserving the oil over a period of time and in such form as will lend itself to use for anthelmintic purposes.

An object of this invention is, in effect, to produce a synthetic wormseed by sealing in oil of chenopodium to preclude its volatilization and at the same time preserve the oil in a form which will be attractive to and easily digestible by the animal. By so doing the anthelmintic may be packaged and preserved for many months without loss of its anthelmintic properties, and dependence on the variable natural supply of the oil is eliminated.

Still another object of the invention is to accomplish the above ends and at the same time supply substantial food value to the product, thus enabling it to serve the dual purpose of a feed and an anthelmintic.

Broadly the invention comprises the impregnation of granules of animal feed such as corn meal with anthelmintic in the form of oil of chenopodium and subsequently coating the granules so impregnated with an edible and readily digestible substance which seals in the oil and precludes loss of effectiveness through volatilization.

To this end the corn meal is placed in a mixer and agitated. During agitation the meal is sprayed with oil of chenopodium, with or without a diluent. It has been found that for a given weight of meal the spray should be sufficient to produce an oil impregnation of approximately 2% by weight with an 0.5% overfill to allow for volatilization during the ensuing coating process. The meal absorbs the oil readily by virtue of its starch content.

Agitation of the meal so impregnated is continued and the mass is then sprayed with a protein solution, preferably a phosphoprotein in the form of casein derived from milk or some other similar source. Casein is soluble in an alkali solution and the casein solution is formed by dissolving the casein in some alkali solution such as a sodium hydroxide solution and adding water to obtain optimum sprayability. A 7.5% aqueous solution of casein weighted to about 20% of the weight of the corn meal prior to oil impregnation has been found eminently satisfactory. This operation results in thoroughly coating the impregnated granules with the casein solution.

While continuing agitation, the corn meal is then sprayed with an acidified alcohol to precipitate the casein from solution. To this end isopropyl alcohol is preferably used and acidified by hydrochloric acid. During this spraying operation the acid functions to precipitate the casein from solution and the alcohol produces an immediate hardening effect on the precipitate, thus forming a coating about the oil-impregnated granules.

For some purposes it is desirable to include in this spray material an alcohol-soluble resin, such as shellac, or rosin, to provide a supplemental coating on the granules. A suitable quantum of acidified alcohol is 8% of the original corn meal weight and if desired a resin may be incorporated to provide a 6.25% resin solution.

The amount of hydrochloric acid added to the alcohol is sufficient to precipitate the amount of casein deposited by the initial spray. The volume of hydrochloric acid needed to produce adequate acidification of the precipitating spray is determined easily. A specific volume of the casein solution is titrated with hydrochloric acid until it is neutralized and the amount of hydrochloric acid necessary to neutralize the entire alkalized casein solution is calculated from this data, which amount is added to the isopropyl alcohol. By using only sufficient acid to obtain the desired precipitation, the granules are maintained in a neutral or very slightly acid condition and there is substantially no excess acidity remaining for neutralization by the animal's digestive enzymes.

After the continuously agitated mass of granules has thus been coated with casein precipitate, supplemented if desired by resin as aforesaid, the granules are dried in some suitable manner.

To enhance the appearance of the product and the effectiveness of the seal, which results in maximum permissible storage time without loss of therapeutic effectiveness through volatilization of the contained oil, the granular mass is preferably dried quickly by a blast of hot air and again sprayed, first with a casein solution and subsequently with an acidified alcohol solution as described above.

In some instances it may be desirable to use a diluent for the volatile oil of chenopodium and for this purpose Mazola or corn oil is entirely satisfactory.

For purposes of illustration but not of limitation, a typical production run will be described. Corn meal in the amount of 150 lbs. is first placed in a suitable mixing machine and agitation begun. This mass is then sprayed with a mixture of chenopodium and corn oil consisting of 1 lb. 4 ozs. corn oil and 4 lbs. 1 oz. chenopodium oil. As heretofore stated, the mass is continuously agitated in the mixer during this and subsequent operations. Thorough impregnation of the granules results.

The agitating mass is then sprayed with 30 lbs. of a 7.5% aqueous casein solution, prepared as described heretofore, which coats the oil-impregnated granules thoroughly and completely. While agitation continues the mass is then sprayed with 12 lbs. of isopropyl alcohol carrying in solution 12 ozs. of an alcohol-soluble resin and an amount of hydrochloric acid calculated in the manner heretofore described. The mass is then dried.

Where the additional seal is desired—and this has been found to produce a superior product for reasons outlined above—the agitated mass is subjected to a blast of hot air immediately after the acidified alcohol spray has been applied. An air blast of fifteen minutes' duration is desirable before again spraying the agitated mass with 25 lbs. of the 7.5% casein solution and subsequently spraying with 12 lbs. of the acidified resin alcohol solution described above. It will be noted that the amount of casein solution sprayed for the second coating is somewhat less than that utilized in the initial casein spray operation.

The hot air blast during agitation is very important where subsequent coatings are to be applied and is in any event a suitable means for drying at the end point of the operation. Preferably the coated granules are spread out for drying purposes after all spraying operations have been completed.

During the drying operation the water and alcohol evaporate, leaving a mass of granules provided with an impervious coating which precludes loss through volatilization of the sealed in anthelmintic ingredient. The coating, however, is readily absorbed by the animal's digestive enzymes and carries no offensive odor which might tend to discourage the animal from taking the feed.

While we have described herein a preferred embodiment of the inventive concept and suitable procedures for compounding the same, it should be understood that various equivalents may fall within the confines of the invention and for that reason we wish to be limited only within the scope of the appended claims.

What we claim is:

1. An anthelmintic comprising digestible porous granules of animal feed, oil of chenopodium contained within said porous granules, and a hard coating of casein completely enveloping each of said granules, said hard coating resulting from the precipitation of casein from an alkali solution by an isopropyl alcohol acidified with hydrochloric acid to precipitate and harden the casein on each of the granules.

2. An anthelmintic in accordance with claim 1 and wherein a suplemental resin coating is included in said hard coating by incorporating a resin in said isopropyl alcohol acidified with hydrochloric acid.

3. A method of preserving oil of chenopodium for anthelmintic use which comprises the steps of impregnating digestible porous granules of animal feed with oil of chenopodium, coating each of said granules with casein in an alkali solution, then contacting said coating with isopropyl alcohol acidified with hydrochloric acid to precipitate and harden the casein on each of the granules thereby inhibiting volatilization of the oil of chenopodium.

4. A method of preserving oil of chenopodium for anthelmintic use which comprises the steps of agitating a mass of digestible porous granules of animal feed, spraying the agitated granules with oil of chenopodium to impregnate the granules therewith, spraying the resultant impregnated granules with casein in an alkali solution to coat each granule therewith, then contacting said coating with isopropyl alcohol acidified with hydrochloric acid to precipitate and harden the casein on each of the granules thereby inhibiting volatilization of the oil of chenopodium.

References Cited in the file of this patent

UNITED STATES PATENTS

| | | |
|---|---|---|
| 2,086,766 | Chuck | July 13, 1937 |
| 2,262,087 | Bartlett | Nov. 11, 1941 |
| 2,480,130 | Fux | Aug. 30, 1949 |
| 2,560,830 | Turner | July 17, 1951 |

FOREIGN PATENTS

| | | |
|---|---|---|
| 414,353 | Great Britain | July 25, 1934 |

OTHER REFERENCES

Thompson et al.: J. A. P. A. (Sci. Ed.) vol. 34, No. 5, May 1945, pages 135 to 137.

U. S. Dispensatory, 24th ed. (1947), page 252.